United States Patent [19]

Nagahiro et al.

[11] Patent Number: 5,024,191
[45] Date of Patent: Jun. 18, 1991

[54] CONTROL SYSTEM FOR A VARIABLE VALVE ACTUATING MECHANISM OF AN INTERNAL COMBUSTION ENGINE

[75] Inventors: Kenichi Nagahiro; Takashi Moriya, both of Saitama, Japan

[73] Assignee: Honda Giken Kogyo Kabushiki Kaisha, Tokyo, Japan

[21] Appl. No.: 483,255

[22] Filed: Feb. 22, 1990

[30] Foreign Application Priority Data

Feb. 22, 1989 [JP] Japan .................................... 1-42268

[51] Int. Cl.⁵ ............................................. F02B 77/00
[52] U.S. Cl. ............................... 123/198 D; 123/90.16; 123/435
[58] Field of Search ............... 123/90.15, 90.16, 90.17, 123/90.18, 198 D, 425, 435

[56] References Cited

U.S. PATENT DOCUMENTS

| 4,356,551 | 10/1982 | Iwase et al. | 123/435 |
| 4,541,392 | 9/1985 | Ogino | 123/198 D |
| 4,648,364 | 3/1987 | Wills | 123/198 D |
| 4,876,995 | 10/1989 | Otobe et al. | 123/90.16 |
| 4,899,701 | 2/1990 | Inoue et al. | 123/90.16 |
| 4,924,823 | 5/1990 | Ogura et al. | 123/64 |

FOREIGN PATENT DOCUMENTS 63-147909 6/1988 Japan .

*Primary Examiner*—Noah P. Kamen
*Attorney, Agent, or Firm*—Lyon & Lyon

[57] ABSTRACT

A control system for a variable valve actuating mechanism for an internal combustion engine for varying the lift or timing of intake or exhaust valves in response to engine operating conditions. The control system includes sensors for detecting the pressure in the combustion cylinder and the temperture at the mounting seat of the spark plug. A warning device and fail safe conditions can be activated when an abnormal condition is detected by one of the sensors.

6 Claims, 5 Drawing Sheets

CONTROL SYSTEM FOR A VARIABLE VALVE ACTUATING MECHANISM OF AN INTERNAL COMBUSTION ENGINE

TECHNICAL FIELD

The present invention relates to a variable valve actuating mechanism for actuating intake and/or exhaust valves of an internal combustion engine, and in particular to a control system which can monitor the operating condition of such a variable valve actuating mechanism.

BACKGROUND OF THE INVENTION

It has been previously proposed to change the timing and/or the lift of intake and exhaust valves of internal combustion engines to the end of optimizing the performance of the engine over a wide operating range. In some cases, a plurality of intake or exhaust valves are provided in each cylinder, and only one of them is actuated while the other is kept closed in low speed operating condition of the engine. The other valve of each cylinder is also actuated in high speed operating condition of the engine.

It is generally preferred to increase the opening area and the open time period of intake and exhaust valves in high speed range of engine operation to reduce resistance to intake and exhaust flows, and to reduce the opening area and the open time period of intake and exhaust valves in low speed range of engine operation to utilize inertia effects of intake and exhaust flows to an advantage. For instance, copending U.S. patent application Ser. No. 07/388,259 filed Aug. 1, 1989 discloses a variable timing valve actuating mechanism which is provided with low speed cam lobes and high speed cam lobes in its cam shaft so that the intake and exhaust valves of the engine may be actuated according to different timing schedules depending on the operating condition of the engine.

According to this previously proposed variable timing valve actuating mechanism, a plurality of rocker arms are pivotally supported by a common rocker shaft for each of the cylinders, and by selectively coupling some of the rocker arms integrally with one another by means of slidable pins extending in parallel with the rocker shaft the lift and the timing of the valves are changed in stepwise fashion depending on the rotational speed of the engine. Each of the slidable pins is normally confined within the associated rocker arm, but it may be selectively actuated so as to fit into a guide bore of the adjoining rocker arm so as to integrally join the two adjoining rocker arms with each other.

In order to ensure a smooth and reliable operation of such a suitable pin structure, it is necessary to maintain an exact alignment of the guide bores of two adjoining rocker arms. However, due to wears of cam slipper surfaces of the rocker arms and other reasons, a misalignment between the guide bores could occur, and a smooth operation of the slidable pin may not be ensured. Further, if any failure of a control valve for supplying hydraulic pressure to actuate the slidable pin should occur, a smooth operation of the valve actuating mechanism is not possible. It is therefore preferred to monitor the operation of the valve actuating mechanism to allow a corrective measure to be taken and ensure the reliability of the engine. Based upon this recognition, the assignee of this patent application has previously proposed a variable valve actuating mechanism having means for detecting unsatisfactory operation of slidable pins in Japanese patent laid opening publication No. 63-147909.

BRIEF SUMMARY OF THE INVENTION

In view of such problems of the prior art, a primary object of the present invention is to provided a control system for a variable valve actuating mechanism which can improve the reliability of the valve actuating mechanism.

A second object of the present invention is to provide a control system for a variable valve actuating mechanism which is simple in structure and can quickly detect any fault in the valve actuating mechanism.

These and other objects of the present invention can be accomplished by providing a control system for a variable valve actuating mechanism for an internal combustion engine having a camshaft for actuating intake or exhaust valves, and adjusting means for changing a lift or valve timing of the intake or exhaust valves, comprising: sensor means for detecting a state of combustion in a cylinder of the engine to monitor an operating condition of the variable valve actuating mechanism.

Since any important failure in the valve actuating mechanism is quickly reflected in the state of combustion in the engine, it is possible to detect the operating condition of the valve actuating mechanism for each cylinder by monitoring the state of combustion such as cylinder pressure, spark plug seat temperature, etc. for each cylinder. The obtained information may be utilized as a basis for carrying out a fail safe manipulation and issuing a warning.

If the engine comprises a plurality of cylinders, it is possible to identify a faulty cylinder when any abnormal condition is detected by the sensor means by arranging the sensor means to each of the cylinders and analyzing data from these sensor means.

BRIEF DESCRIPTION OF THE DRAWINGS

Now the present invention is described in the following with reference to the appended drawings, in which.

DETAILED DESCRIPTION OF THE PREFERRED EMBODIMENT

Figure 1:
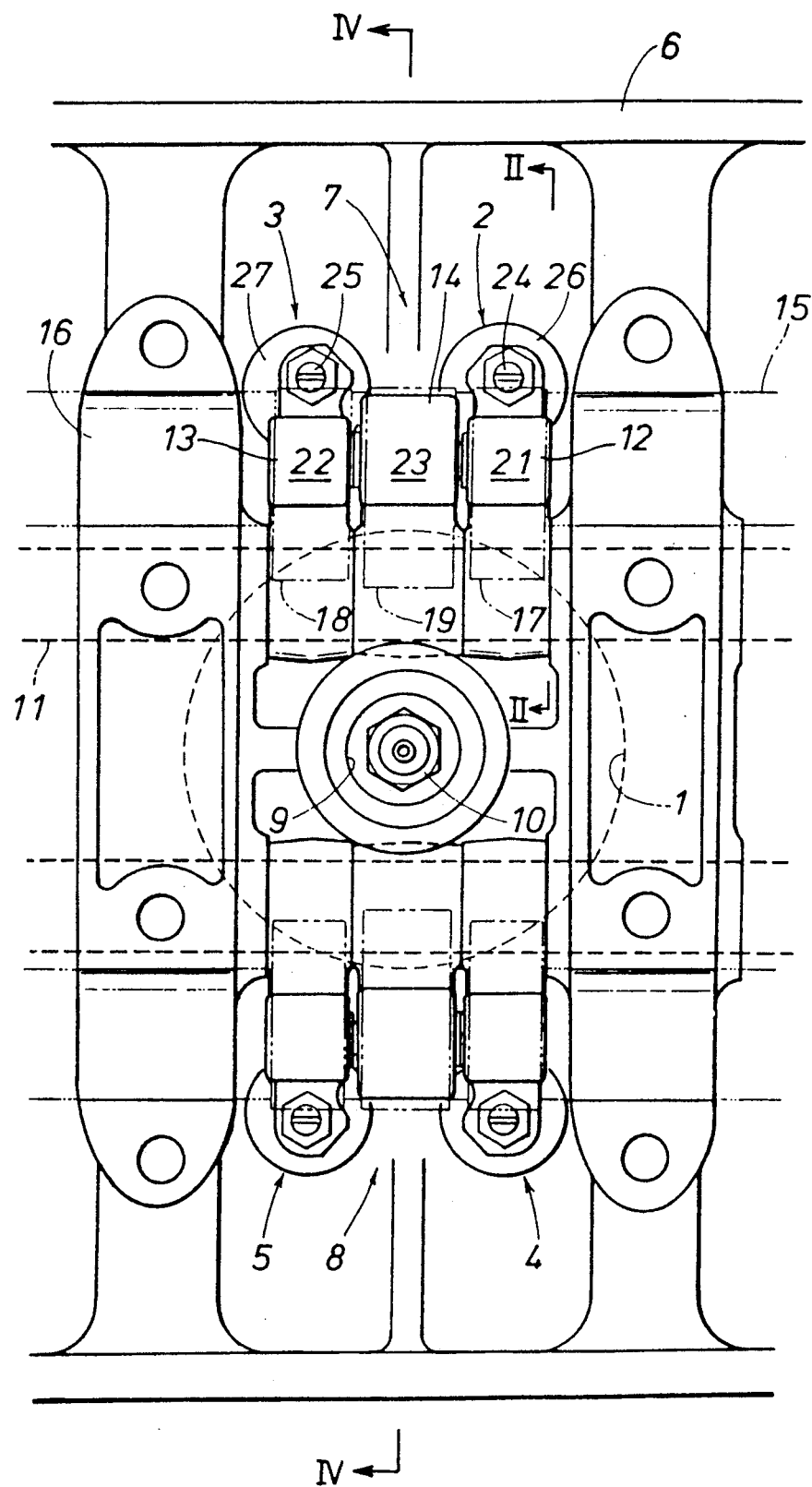
FIG. 1 is a plan view of a valve actuating mechanism of an internal combustion engine to which the present invention is applied.

Referring to FIG. 1, the illustrated DOHC multiple cylinder engine comprises a pair of intake valves 2 and 3 and a pair of exhaust valves 4 and 5 for each of its cylinders 1, and its cylinder head 6 which is attached to the upper end of its cylinder block incorporates a valve actuating mechanism 7 for the intake valves and another valve actuating mechanism 8 for the exhaust valves 4 and 5 in a mutually parallel and symmetric relationship. The part of the cylinder head 6 corresponding to a central part of each of the cylinders 1 is provided with a spark plug introduction bore 9 for receiving a spark plug 10 as described hereinafter. Since the two valve actuating mechanisms 7 and 8 are provided with a substantially identical structure and they each consist of a plurality of substantially identical units, each corresponding to one of the cylinders 1, only the valve actuating mechanism 7 for the intake valves is described for one of the cylinders 1 in most part of the following description.

Figure 2:
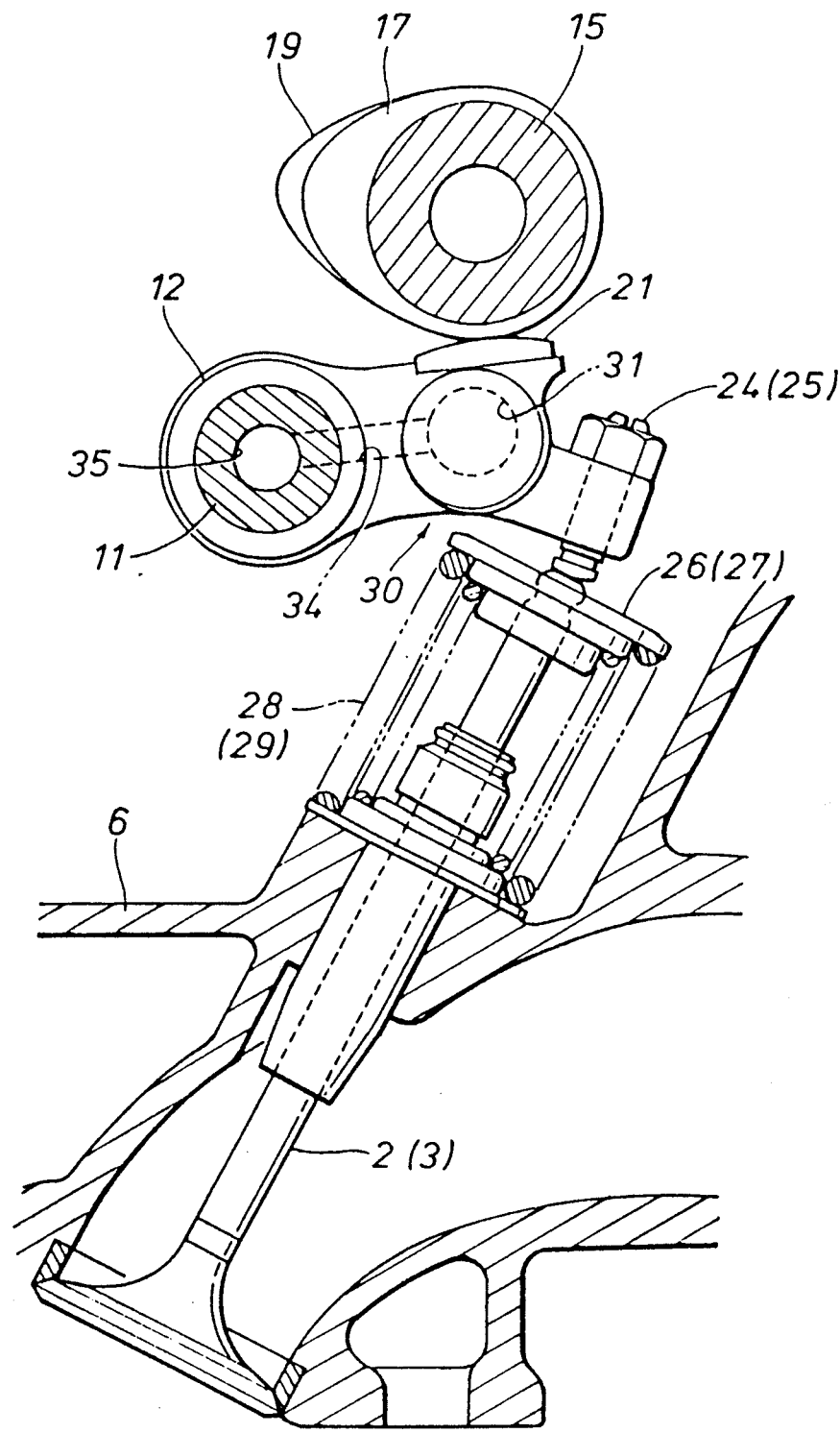
FIG. 2 is a sectional view taken along line II—II of FIG. 1.

A rocker shaft 11 is fixedly secured to the cylinder head 6, and pivotally supports three rocker arms 12 through 14 for each of the cylinders 1 one next to another in an individually rotatable manner around the rocker shaft 11. Referring to FIG. 2, a camshaft 15 is rotatably supported by journal bearings 16 formed on the cylinder head 6 and extends in parallel with the rocker shaft 11 above the rocker arms 12 through 14. The camshaft 15 is provided with a pair of low speed cam lobes 17 and 18 having a relatively low cam lift and a high speed cam lobe 19 having a relatively large cam lift interposed between the low speed cam lobes 17 and 18.

The upper surface of a free end portion of each of the rocker arms 12 through 14 is integrally provided with a cam slipper 21 through 23 for engaging an associated one of the cam lobes 17 through 19. The extreme free ends of the first and second rocker arms 12 and 13 cooperating with the low speed cam lobes 17 and 18 are each provided with a tappet screw 24 or 25, and the lower end of each of the tappet screws 24 and 25 abuts the upper end of the associated one of the intake valves 2 and 3 which are urged by valve springs 28 and 29 via spring retainers 26 and 27 towards their closing directions. The third rocker arm 14 located between the first and second rocker arms 12 and 13 cooperating with the high speed cam lobe 19 is urged upwards by a lost motion spring not shown in the drawings abutting the lower surface of the third rocker arm 14.

Figure 3:
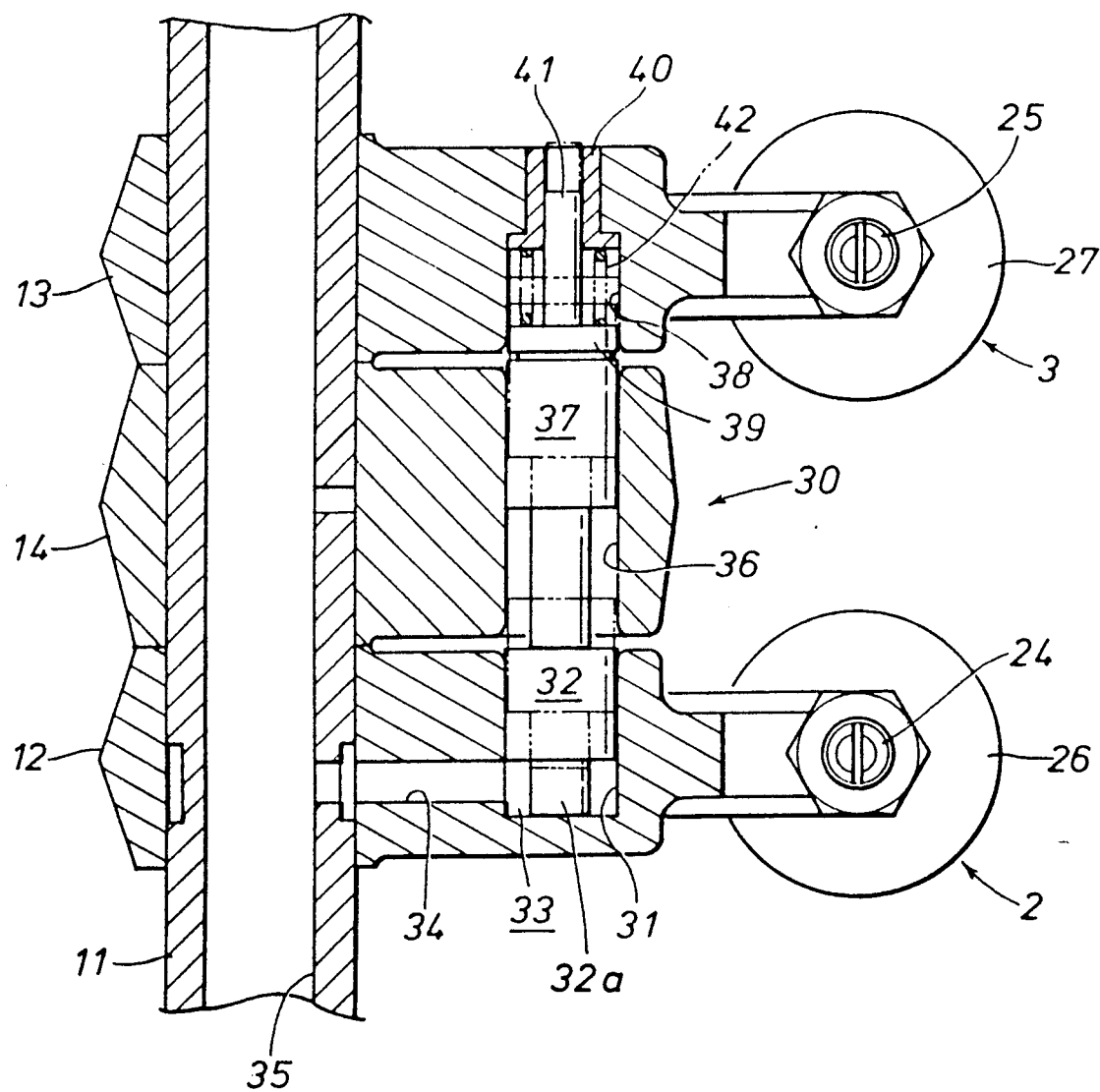
FIG. 3 is a sectional view taken along line III—III of FIG. 2.

Referring to FIG. 3, the mutually adjoining first through third rocker arms 12 through 14 incorporate therein a selective coupling unit 30 for selectively coupling the three rocker arms 12 through 14 with one another. During a low speed and medium speed range of engine operation, the rocker arms 12 through 14 are actuated individually by their associated cam lobes 17 through 19. During a high speed range of engine operation, the three rocker arms 12 through 14 are integrally coupled with one another by this selective coupling unit 30.

The selective coupling unit 30 comprises a first guide bore 31 extending in the first rocker arm 12 in parallel with the rocker shaft 11 with its outer end closed and its inner end facing the second rocker arm 14 and opening out, a second guide bore 38 extending through the second rocker arm 13 coaxially with the first guide bore 31, and a third guide bore 36 extending through the third rocker arm 14 so as to be coaxial with the first and second guide bores 31 and 38 in the rest condition of the rocker arms 12 through 14 when their slipper 21 are in contact with the base circles of the cam lobes 17 through 19. The first guide bore 31 receives a first selector pin 32 which is slidably received in the first guide bore 31 defining an oil chamber 33 between the bottom end of the first guide bore 31 and the rear end surface of the first selector pin 32, and this oil chamber 33 is communicated with an oil supply passage 35 defined in the rocker shaft 11 via a communication passage 34 defined in the first rocker arm 12. The second guide bore 38 slidably receives a second selector pin 39 with its stem portion 41 extending from its rear end surface guided by a guide sleeve 40 fitted into the second guide bore 38. The second guide pin 38 is urged by a compression coil spring 42 interposed between an annular shoulder surface defined in the guide sleeve 40 and another annular shoulder surface defined in the second selector pin 39 towards the second rocker arm 14. The third guide bore 36 slidably receives a third selector pin 37 which abuts the front end surface of the first selector pin 32 at its one end and the front end surface of the second selector pin 39 at its other end.

Figure 4:
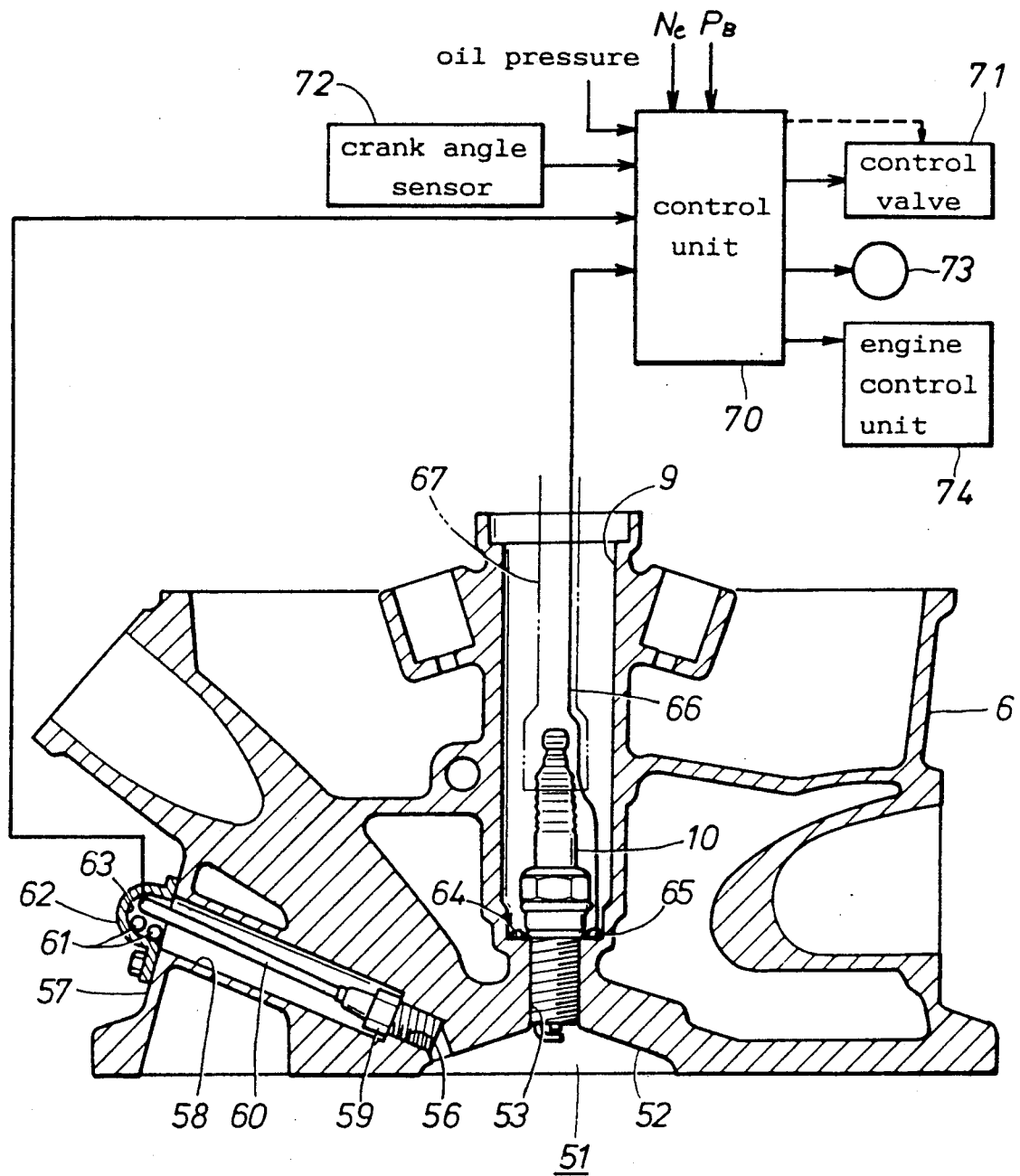
FIG. 4 is a sectional view taken along line IV—IV of FIG. 1.
Figure 5:
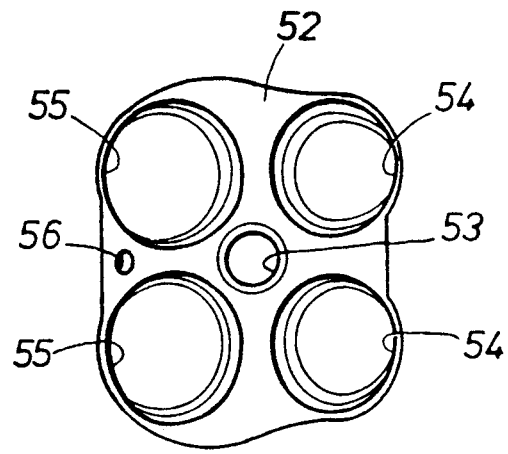
FIG. 5 is a bottom view showing an upper surface of a combustion chamber.

Referring to FIG. 4, the cylinder head 6 is provided with a plurality of recesses each defining a part of a combustion chamber 52 for each of the cylinders 1. A bottom end of the spark plug introduction bore 9 communicates with the combustion chamber 52 via a threaded opening 53 which receives the spark plug 10 with its electrodes protruding into the combustion chamber 52. Thus, the spark plug 10 is surrounded by the intake and exhaust valves 2 through 5 received by associated intake and exhaust valve openings 54 and 55. Further, an additional small bore 58 is passed through the cylinder head 6 between the two exhaust valve openings 55 and communicates with the combustion chamber 52 via a threaded opening 56 for threadably receiving therein a pressure sensor 59 for detecting a pressure in the combustion chamber 52.

The pressure sensor 59 is provided with lead wires 60 which are, along with other lead wires 61 of the pressure sensors for other cylinders, passed through a conduit 63 and connected to a control unit 70, and supplies an electric signal corresponding to the internal pressure of the combustion chambers 52 to the control unit 70.

An annular seat surface 64 for receiving the spark plug 10 is provided with an annular temperature sensor 65, and its lead wires 66 are led out of the spark plug introduction bores 9, along with ignition cords 67, and are connected to the control unit 70 to supply an electric signal corresponding to the temperature of the seat surface 64 to the control unit 70. It is also possible to integrally mold the lead wires 66 of the temperature sensor 64 with the ignition cords 67.

The control unit 70 assesses the operating condition of the engine according to a rotational speed Ne of the engine and an intake negative pressure $P_B$, and controls a hydraulic valve 71 for controlling the operation of the selective coupling unit 30 by selectively supplying hydraulic fluid to the oil supply passage 35.

During a low and medium operating range of the engine, since no hydraulic pressure is supplied to the oil chamber 33, the first through third selector pins 32, 37 and 39 are urged towards the oil chamber 33 until a stem portion 32a extending from the rear end of the first selector pin 32 abuts the bottom surface of the first guide bore 31 under the spring force of the return spring 42, and the rocker arms 12 through 14 are actuated individually by their associated cam lobes 17 through 19. Thus, the intake valves 2 and 3 are actuated with a relatively small lift, and their opening timing is delayed while their closing timing is advanced. The second rocker arm 14 is actuated by the high speed cam lobe 19, but its movement does not affect the operation of the intake valves 2 and 3 at all.

During a high speed operation of the engine, hydraulic fluid is supplied to the oil chamber 33 via the oil supply passage 35 and the communication passage 34, and the first and third selector pins 32 and 37 are pushed into the third and second guide bores 36 and 38, respectively, against the spring force of the return spring 42, and the three rocker arms 12 through 14 are integrally coupled with one another. Since the high speed cam lobe 19 has a largest cam lift, the first and second rocker arms 12 and 13 are actuated by the high speed cam lobe 19 by way of the third rocker arm 14. Therefore, the intake valves 2 and 3 are opened according to the cam profile of the high speed cam lobe 19, and are actuated with a relatively large lift, and their opening timing is advanced while their closing timing is delayed.

Figure 6:
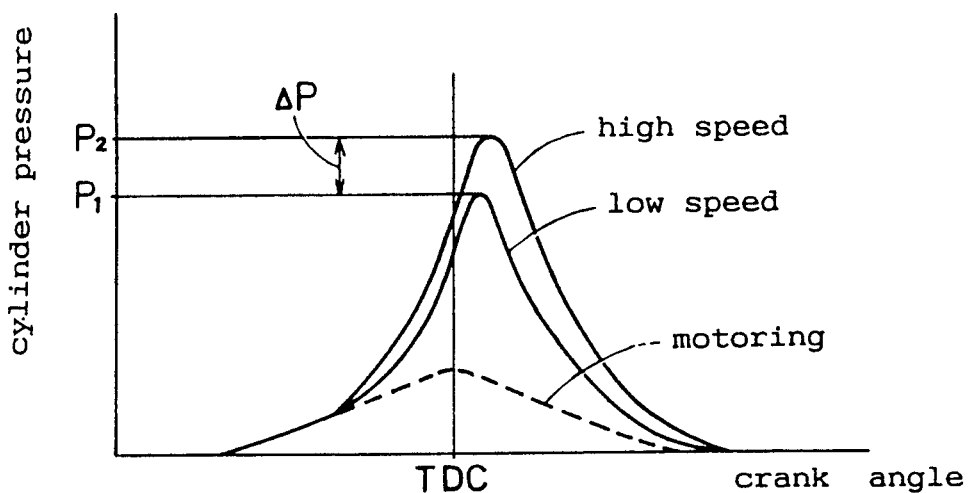
FIG. 6 is an indicator diagram showing the change in cylinder pressure.
Figure 7:
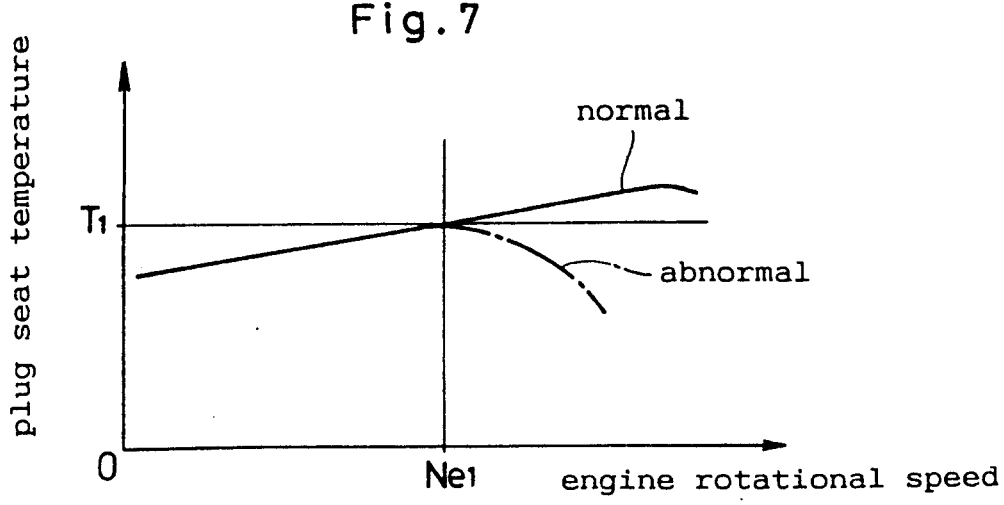
FIG. 7 is a graph showing the change in spark plug seat temperature.

The output from the pressure sensor 59 represents the pressure in the cylinder, and demonstrates a wave form having a pronounced peak near the top dead center (TDC) as opposed to the time of motoring as shown in FIG. 6. During a low speed operation of the engine, since combustion takes place according to the valve timing and the valve lift corresponding to the low speed cam lobes 17 and 18, the peak value P1 of the cylinder pressure occurs a short time after the top dead center. During a high speed operation of the engine, the wave form of cylinder pressure is similar to that of the low speed operation, but the peak value P2 of the cylinder pressure is higher than the peak value P1 of the low speed operation since combustion takes place according to the valve timing and the valve lift corresponding to the high speed cam lobe 19.

The control unit 70 stores therein different cylinder pressure indicator diagrams, in particular their peak values, for different values of the load of the engine and the rotational speed of the engine as a map. Thus, it is possible to detect the operating condition of the valves, in particular, the transition of the valve actuating mechanism from a low speed condition to a high speed condition or from a high speed condition to a low speed condition by comparing the difference between the peak values $\Delta P$ ($=P2-P1$) and a map value.

Meanwhile, the plug seat temperature detected by the temperature sensor 59 rises with the increase in the rotational speed of the engine. In particular, there is a relatively sharp rise when the rotational speed has exceeded a predetermined level Ne1 and the valve mechanism is switched over from the low speed condition to the high speed condition. On the other hand, if the low speed condition is continued even after the rotational speed of the engine has exceeded this level Ne1, the temperature drops. The control unit 70 stores the relationship between the plug seat temperature as detected by the temperature sensor 59, the rotational speed of the engine, and the load of the engine as a map, and can determine the operating condition of the valves by comparing the plug seat temperature as detected by the temperature sensor 59 and the corresponding value obtained from the map.

Should any abnormal condition is detected in the valve timing switch-over for any of the cylinders and its valve timing has failed to change from a low speed operating condition to a high speed operating condition even when the rotational speed of the engine has exceeded a threshold level for such a switch over is intended to take place, since the pressure peak value and the spark plug seat temperature detected by the pressure sensor 59 and the temperature sensor 65 become lower than the values stored in the control unit 70, this abnormal condition can be readily detected. Further, by combining the use of a crank angle sensor 72, it is possible to identify the cylinder in which a faulty operation of the selective coupling unit has occurred. Alternatively, the faulty cylinder can be identified by comparing the data obtained from different cylinders.

When any abnormal condition is detected, any damage to the engine can be prevented by the control unit 70 forcing an engine control unit 74 to shift ignition timing, to discontinue fuel supply, and/or to close the throttle valve. At the same time, a warning light 73 is turned on to warn the operator of the vehicle. Further, the control unit 70 acts upon the control valve 71 to force the valve actuating mechanism for other cylinders to low speed condition, and restrict the selective coupling mechanism 30 to a low speed condition. By doing so, a minimally acceptable engine operating condition can be ensured even under such a faulty condition of the selective coupling mechanism 30, and occurrence of abnormal conditions to other parts of the valve actuating mechanism by chain reaction can be avoided.

When the engine is operating in the high speed condition and hydraulic pressure is removed from the oil pressure chamber 33, the selector pins 32, 37 and 39 are urged toward the associated guide bores 31, 36 and 38 by the return spring 42, and the low speed operating condition can be attained. In this case also, if any one of the cylinders is kept in the high speed operating condition, since the peak value detected by the pressure sensor of this particular cylinder is higher than those of other cylinders, it is possible to detect the occurrence of the abnormal condition, and identify the faulty cylinder.

The present invention is not limited by the above example, and can be implemented in various other modes. For instance, the mounting position of the pressure sensor can be freely modified to suit each particular configuration of the combustion chamber. Also, although the above embodiment was directed to a twin rocker arm structure, the present invention can be applied to other types of valve actuating mechanisms such as single rocker arm structures and direct cam drive bucket tappet structures without departing from the spirit of the invention.

Thus, according to the present invention, based upon the recognition that the combustion condition of each of the cylinders is affected by the switch over in a variable valve actuating mechanism, it is possible to detect the operating condition of the valve actuating mechanism for each cylinder by monitoring the cylinder pressure, the spark plug seat temperature, etc., and can contribute to the improvement in the reliability of the variable valve actuating mechanism for an internal combustion engine.

What we claim is:

1. A control system for a variable valve actuating mechanism for an internal combustion engine having a camshaft for actuating intake or exhaust valves, and adjusting means for changing a lift or valve timing of said intake or exhaust valves, comprising:

sensor means for detecting a state of combustion in a cylinder of said engine so as to indirectly monitor an operating condition of said variable valve actuating mechanism;

a control unit which acts upon said valve actuating mechanism to force it to a certain fail safe condition when any abnormal condition is detected by said sensor means.

2. A control system according to claim 1, wherein said sensor means comprises a pressure sensor for detecting a pressure in said cylinder.

3. A control system according to claim 1, wherein said sensor means comprises an annular temperature sensor detecting a temperature of a part of said engine.

4. A control system according to claim 3, wherein said sensor means comprises a temperature sensor for measuring a temperature of a spark plug mounting seat.

5. A control system according to claim 1, further comprising a control unit which activates warning means when any abnormal condition is detected by said sensor means.

6. A control system according to claim 1, wherein said engine comprises a plurality of cylinders, and said sensor means is provided for each of said cylinders, said control unit being provided with means to identify the cylinder with the faulty valve actuating mechanism when any abnormal condition is detected by said sensor means.

* * * * *